United States Patent
Thomas

(10) Patent No.: US 9,738,047 B2
(45) Date of Patent: Aug. 22, 2017

(54) COMPRESSION SCREW FOR PRODUCING ANIMAL FEED

(71) Applicant: Michael Ray Thomas, St. Clair, MO (US)

(72) Inventor: Michael Ray Thomas, St. Clair, MO (US)

(73) Assignee: Nationwide 5, LLC, Ord, NE (US)

( * ) Notice: Subject to any disclaimer, the term of this patent is extended or adjusted under 35 U.S.C. 154(b) by 0 days.

(21) Appl. No.: 14/866,926

(22) Filed: Sep. 26, 2015

(65) Prior Publication Data

US 2017/0087790 A1    Mar. 30, 2017

(51) Int. Cl.
| | | |
|---|---|---|
| *A23P 1/12* | (2006.01) | |
| *B30B 11/24* | (2006.01) | |
| *A23P 1/02* | (2006.01) | |
| *A23L 1/18* | (2006.01) | |
| *A23P 30/20* | (2016.01) | |
| *A23L 1/00* | (2006.01) | |
| *A23K 1/18* | (2006.01) | |
| *A23P 10/25* | (2016.01) | |
| *A23P 10/28* | (2016.01) | |
| *A23P 10/20* | (2016.01) | |
| *A23K 1/00* | (2006.01) | |

(52) U.S. Cl.
CPC ......... *B30B 11/246* (2013.01); *B30B 11/243* (2013.01); *A23K 1/003* (2013.01); *A23K 1/186* (2013.01); *A23L 1/0023* (2013.01); *A23L 1/0076* (2013.01); *A23L 1/1805* (2013.01); *A23P 1/02* (2013.01); *A23P 1/025* (2013.01); *A23P 1/027* (2013.01); *A23P 1/12* (2013.01); *A23P 1/125* (2013.01); *A23P 10/20* (2016.08); *A23P 10/25* (2016.08); *A23P 10/28* (2016.08); *A23P 30/20* (2016.08)

(58) Field of Classification Search
CPC ..... B30B 11/24; B30B 11/243; B30B 11/245; B30B 11/246; A23K 1/003; A23K 1/186; B29C 47/48; A23P 1/12; A23P 1/125; A23P 1/027; A23P 1/025; A23P 1/02; A23P 1/20; A23P 10/20; A23P 10/25; A23P 10/28; A23P 30/20; A23L 1/0076; A23L 1/1805; A23L 1/0023; A23G 3/0205

USPC ......... 425/204, 207, 208, 209, 376.1, 378.1, 425/382.3

See application file for complete search history.

(56) References Cited

U.S. PATENT DOCUMENTS

| | | | | |
|---|---|---|---|---|
| 4,088,528 A | * | 5/1978 | Berger | B30B 9/121 162/19 |
| 4,525,313 A | * | 6/1985 | Muller | B30B 11/24 149/109.6 |
| 4,600,311 A | * | 7/1986 | Mourrier | B29C 47/0822 366/322 |

(Continued)

*Primary Examiner* — Seyed Masoud Malekzadeh
(74) *Attorney, Agent, or Firm* — Doster Greene, LLC

(57) ABSTRACT

An animal feed producing system comprises a compression screw assembly. The compression screw assembly includes at least a first screw, a second screw and a plurality of barrels. The first and second screws include a plurality of flights and roots. The plurality of screws is configured such that they include a plurality of sections. Each section comprises a set of plurality of flights and a plurality of roots configured to perform a specific compression function, such as perpendicular compression and lateral compression.

4 Claims, 7 Drawing Sheets

(56) References Cited

U.S. PATENT DOCUMENTS

| | | | | | |
|---|---|---|---|---|---|
| 4,839,193 | A | * | 6/1989 | Mange | A23G 3/0205 |
| | | | | | 426/448 |
| 4,875,847 | A | * | 10/1989 | Wenger | B30B 11/243 |
| | | | | | 264/211.21 |
| 4,935,183 | A | * | 6/1990 | Wenger | B30B 11/243 |
| | | | | | 264/211.11 |
| 4,960,601 | A | * | 10/1990 | Cummins | A21C 3/04 |
| | | | | | 366/85 |
| 4,981,711 | A | * | 1/1991 | Kearns | A23J 3/26 |
| | | | | | 426/1 |
| 5,773,070 | A | * | 6/1998 | Kazemzadeh | A23K 1/003 |
| | | | | | 426/516 |
| 5,939,124 | A | * | 8/1999 | Wenger | A23K 1/003 |
| | | | | | 426/516 |
| 7,521,076 | B1 | * | 4/2009 | Wenger | A23N 17/005 |
| | | | | | 426/510 |
| 2004/0115324 | A1 | * | 6/2004 | Richard | B30B 11/245 |
| | | | | | 426/512 |

\* cited by examiner

COMPRESSION SCREW FOR PRODUCING ANIMAL FEED

BACKGROUND OF THE DISCLOSURE

Technical Field of the Disclosure

The present embodiment relates generally to compression screws employed to prepare animal feed products, such as dry grains, pellets, cubes, and tubs.

Description of the Related Art

In the field of animal feed processing, dried distiller grain (DDG) or dried distiller grain with solubles (DDGS) is a major feed source for farm livestock. This is due in part to the increased commercial interest in ethanol production. Generally, DDG and DDGS include an average 88% dry matter and 12% moisture. The dry matter is in the form of particulates formed from grinding grain kernels like corn during the process of producing ethanol from grain. Due to its chemical composition, particulates, typically, do not flow like liquids or melted plastics. Therefore, when compression screws are used to prepare the DDG or DDGS as animal feed, it typically does not flow through the flight geometry of the screws, because DDG and DDGS consist, on average, of 88% dry matter (particulates).

Farmers often use animal feed as part of a daily diet to provide energy, protein, minerals, and vitamins to livestock. These animal feed can be formed as grains, pellets, cubes, or tubs. In some conventional methods, the pellets, cubes or tubs are formed by compressing dried grains with the addition of binder materials or supplements that help the resulting product become dense and cohesive. Even with these additives, these animal feed products can fall apart or crumble. Thus, it may be desirable to produce a pellet, cube or tub having the highest protein and fat content, as naturally possible. A system and method is needed that produces a sufficiently dense animal feed product, such as pellets, cubes, and tubs, having the highest fat and protein content, without adding any binders, which are non-natural additives like molasses.

Some of the conventional animal feed producing methods require a heating or curing process applied to the product after it is formed in order to boil off the corn oil, which also lowers the protein level. Thus, there is a need to provide a method that does not require a heating or curing process after the pellet, cube, or tub is produced.

It may be desirable to provide a compression screw that is designed such that DDG or DDGS (dried grain) is capable of flowing through the screw geometry during the preparation process. It also may be desired to provide a compression screw system and method that produces animal feed in the form of grains, pellets, cubes or tubs, without the use of a heating or curing process. It may also be desirable to provide an animal feed producing system and method that does not use additives.

SUMMARY OF THE DISCLOSURE

The present teachings may satisfy one or more of the above-mentioned desirable features. Other features and/or advantages may become apparent from the description which follows.

In various embodiments, one or more screws are included in the compression screw assembly to create compression of the treated material. The compression can be created through the use of a wide variety of different kinds of screw. The screw can have a variety of configurations. For instance, the first screw and the second screw can be designed to rotate in a counter clockwise direction which creates a positive displacement pump that enables the grains to move forward in relation to the plurality of screws from the feed section to the tip section and allows the grains to be in constant contact with the hot surfaces of the plurality of screws and barrels. The moisture present in the grains is trapped within the grain, which helps to provide lubricity in the grains. The presence of the moisture trapped at a high temperature creates a lubrication property that enhances the grains ability to flow.

In various embodiments, the animal feed producing system provides restrictive areas created by the geometry of one or more screws to generate perpendicular compression, lateral compression, and/or a combination thereof. The perpendicular compression can be created by forcing the grain through tighter cavities of the flights and roots of the screw. The lateral compression can be created by changing the number of flights and/or the pitch of the flights of the screw.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

The skilled artisan will understand that the drawings described below are for illustrative purposes only. The drawings are not intended to limit the scope of the present teachings in any way.

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

Figure 1:
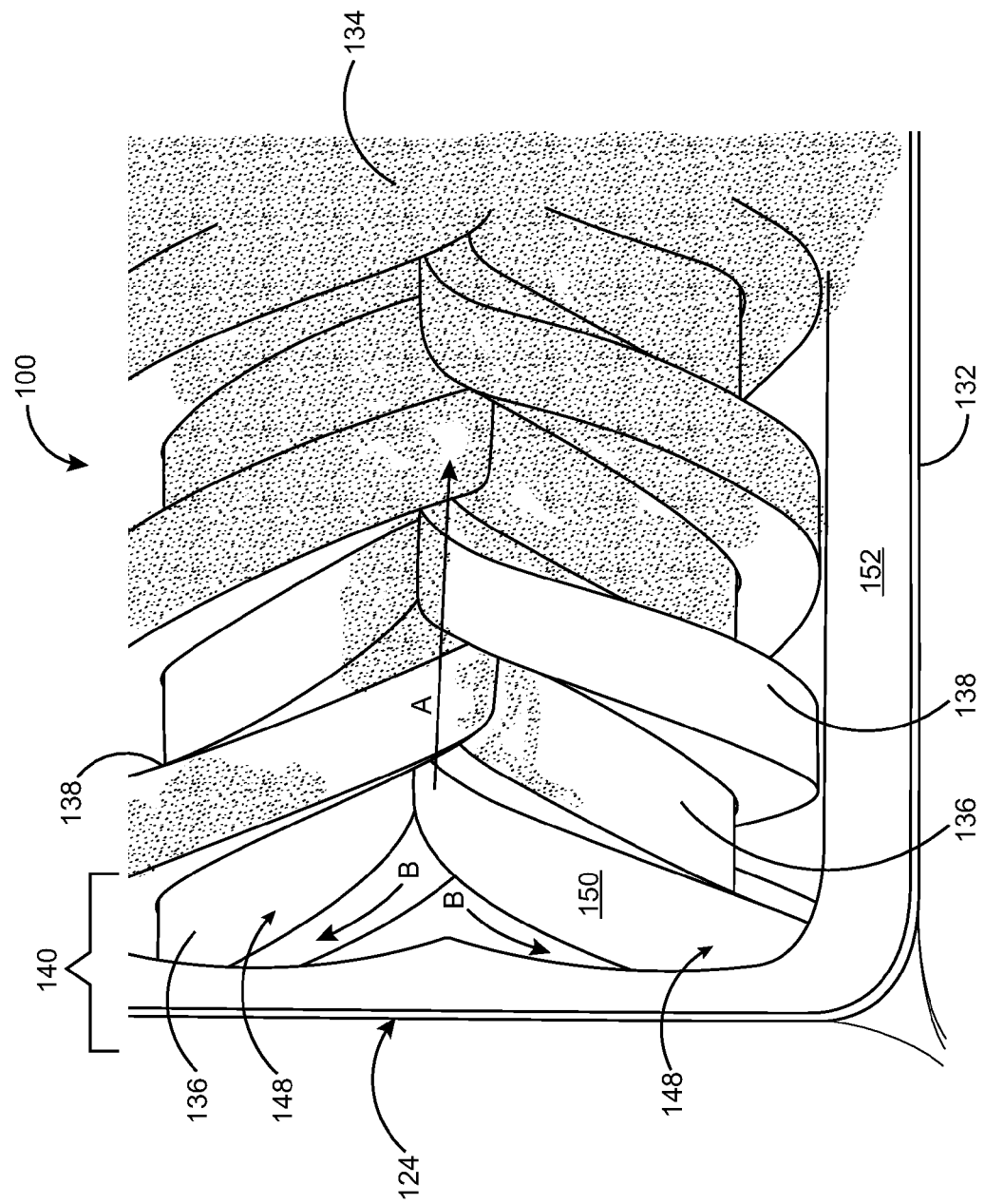
FIG. 1 shows a perspective view of a compression screw assembly of the animal feed producing system according to the present teachings.

Reference will now be made to various embodiments, examples of which are illustrated in the accompanying drawings. However, these various exemplary embodiments are not intended to limit the disclosure. On the contrary, the disclosure is intended to cover alternatives, modifications, and equivalents.

Throughout the application, description of various embodiments may use "comprising" language, however, it will be understood by one of skill in the art, that in some specific instances, an embodiment can alternatively be described using the language "consisting essentially of" or "consisting of."

For purposes of better understanding the present teaching and in no way limit the scope of the teachings, it will be clear to one of skill in the art that the use of the singular includes the plural unless specifically stated otherwise. Therefore, the terms "a," "an" and "at least one" are used interchangeably in this application.

Unless otherwise indicated, all numbers expressing quantities percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. In some instances, "about" can be understood to mean a given value±5%. Therefore, for example, about 100° F., could mean 95-105° F. At the very least, each numerical parameter should at least be construed in light of the number of reported significant digits and by applying ordinary rounding techniques.

In various embodiments, a system 100 can be configured to accommodate a wide range of compression screws with differing structures or geometries that create compression on the treated material. For example, in various embodiments, the apparatus 100 may include one or more screws. FIGS. 1-6 depict various exemplary embodiments of compression screws that can be employed in apparatus 100. The examples shown in FIGS. 1-6 illustrate dual or twin screws. Those skilled in the art would recognize that a single screw, a triple screw, a plurality of screws, or a combination of a variety of screws may be used to compress the treated material.

In various embodiments employing twin or multiple-screw extruders, the screws can rotate in the same direction (co-rotating) or opposite direction (counter-rotating). The screw can include multiple sections that consist of non-intermeshing flights, fully intermeshing flights or a combination of both types of flights. In some embodiments, such screw extruders may be modular, and the screw design can be changed by rearranging the feeding, venting, and mixing elements along the screw shaft.

In various embodiments, the screw(s) are configured to include various mixing zones. In some embodiments, the system 100 employs a set of twin intermeshed screws having various mixing zones. In such an embodiment, the screw can be designed wherein each section has uniquely different sets of flight geometry to perform specific compression functions. For example, sections of the screw geometry can be configured to create perpendicular compression, lateral compression, or a combination thereof. Perpendicular compression can be created by forcing the treated material through tighter cavities of the flights and roots of the screw. Lateral compression can be created by employing a screw configured to have changes within different sections to the number of flights and/or the pitch of the flights.

As discussed above, because DDG and DDGS consist, on average, of 88% dry matter (particulates), it typically does not flow through the flight geometry of the screws 146, 148. However, according to the present teachings, the particulate is pushed forward by a set of twin screws 146, 148 with the unique geometry as illustrated through FIGS. 1-6, as will be explained in more detail below, such that when positioned, timed, and rotated in specified direction, this creates an effect on the particulate that flows like a fluid under pressure. Namely, this means, for every rotation of the screw, the grain moves forward from a feed section towards the tip of the screw. With each rotation, it forces the grain through particular areas of the flights, as well as the root of the screws, where the grain is compressed. This point of compression is unrelated to the restriction created by a conventional die(s), located downstream of the tip of the screw. Rather, this compression occurs due to the design of the screw.

Figure 5:
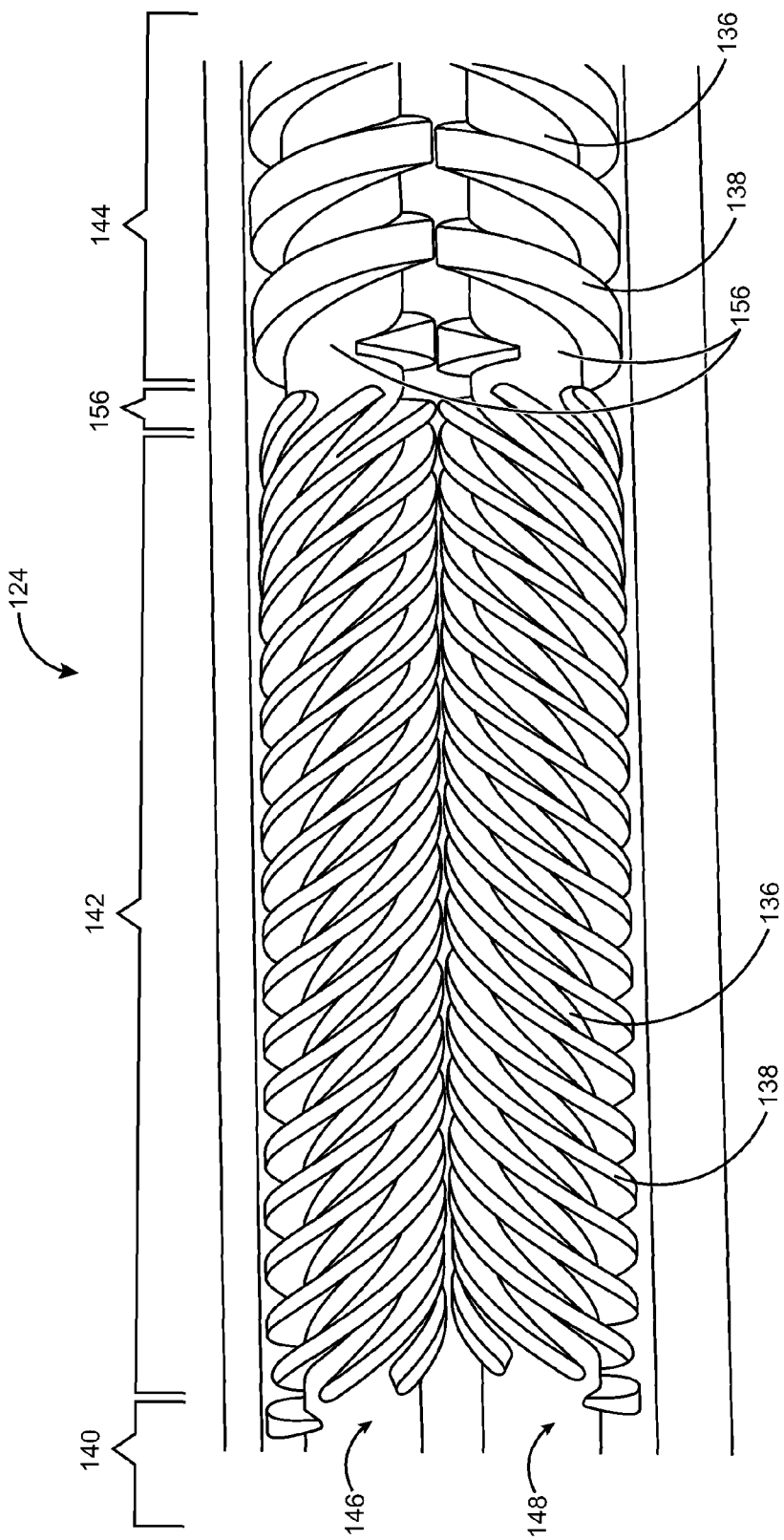
FIG. 5 shows a perspective view of the compression screw assembly illustrating the feed section and a plurality of middle sections in the plurality of screws in accordance with the present teachings.

As illustrated in the exemplary embodiment of FIG. 1, the compression screw assembly 124 includes a plurality of screws 146, 148 and a plurality of barrels 132. In the preferred embodiment, the plurality of screws 146, 148 includes a first screw 146 and a second screw 148. The first and the second screws 146, 148 include, as shown in FIGS. 1 and 5, a feed section 140, a plurality of middle sections 142, 144 and a tip section (not shown). The feed section 140 is adaptable to receive the grains 134 from the feeding hopper (not shown). The feed section 140, the plurality of middle sections 142, 144 and the tip section (not shown) include a plurality of flights 138 and a plurality of roots 136. The flights 138 are the section of the screws 146, 148 that pushes the material as the screw rotates. The roots 136 are located in the flow channel of the screws 146, 148.

According to one example, the first screw 146 and the second screw 148 rotate in a counter clockwise direction which creates a positive displacement pump that enables the grains 134 to move forward in relation to the plurality of screws 146, 148 from the feed section 140 to the tip section and allows the grains 134 to be positioned in constant contact with the hot surfaces 150, 152 of the plurality of screws 146, 148 and barrels 132, respectively. The moisture present in the grains 134 is trapped within the grain, which helps to provide lubricity in the grains. The presence of the moisture trapped at a high temperature creates a lubrication property that enhances the grains ability to flow when the grains 134 pass through a reduced surface area between the plurality of flights 138 and the plurality of roots 136. The dry grains are sheared utilizing the sharp edges of the plurality of flights 138 and the roots 136.

As illustrated in FIGS. 1-6, the screws 146, 148 are designed such that each includes uniquely different set of flight geometries to perform specific compression functions. FIG. 1 illustrates the feed section 140 where the grains 134 are fed into the point of origin in the flights 138 of the screws 146, 148 installed within a screw assembly 124. The flights 138 are the ridges of the screws 146, 148, and the roots 136 are the bottom portions created between the flights 138 of the screws 146, 148. In this example, the screws 146, 148 rotate in a counter rotating direction indicated by the solid-line arrow B (in FIG. 1) which advances the grain 134 in a forward direction as shown by the solid-line arrow A in FIG. 1.

In other embodiments, the screws 146, 148 may co-rotate relative to each other. In some embodiments, the system 100 may be designed to include multiple sets of screws. For example, the system may be configured to include a set of screws that counter-rotates and another set of screws that co-rotates. In this exemplary screw assembly 124, the screws 146, 148 are positioned such that their flights are parallel to each other so that one flight 138 from one screw 146 is situated very tightly between two flights 138 from the other screw 148.

When positioned, timed, and rotated, for example, in a counter clockwise direction, this configuration, as the screws rotate, enables the grain 134 to be forced and compressed in several areas located on the flights and the roots of the screws, as illustrated in FIGS. 1-6. This creates a positive displacement pump that enables the grains 134 to move forward in relation to the plurality of screws 146, 148 from the feed section 140 to the tip section and allows the grains 134 in constant contact with the hot surfaces 150, 152 of the plurality of screws 146, 148 and barrels 132 respectively. The moisture present in the grains 134 is trapped within the grains which enhances the lubricity of the grains 134 as it passes through a reduced surface area between the plurality of flights 138 and the plurality of roots 136.

Figure 2:
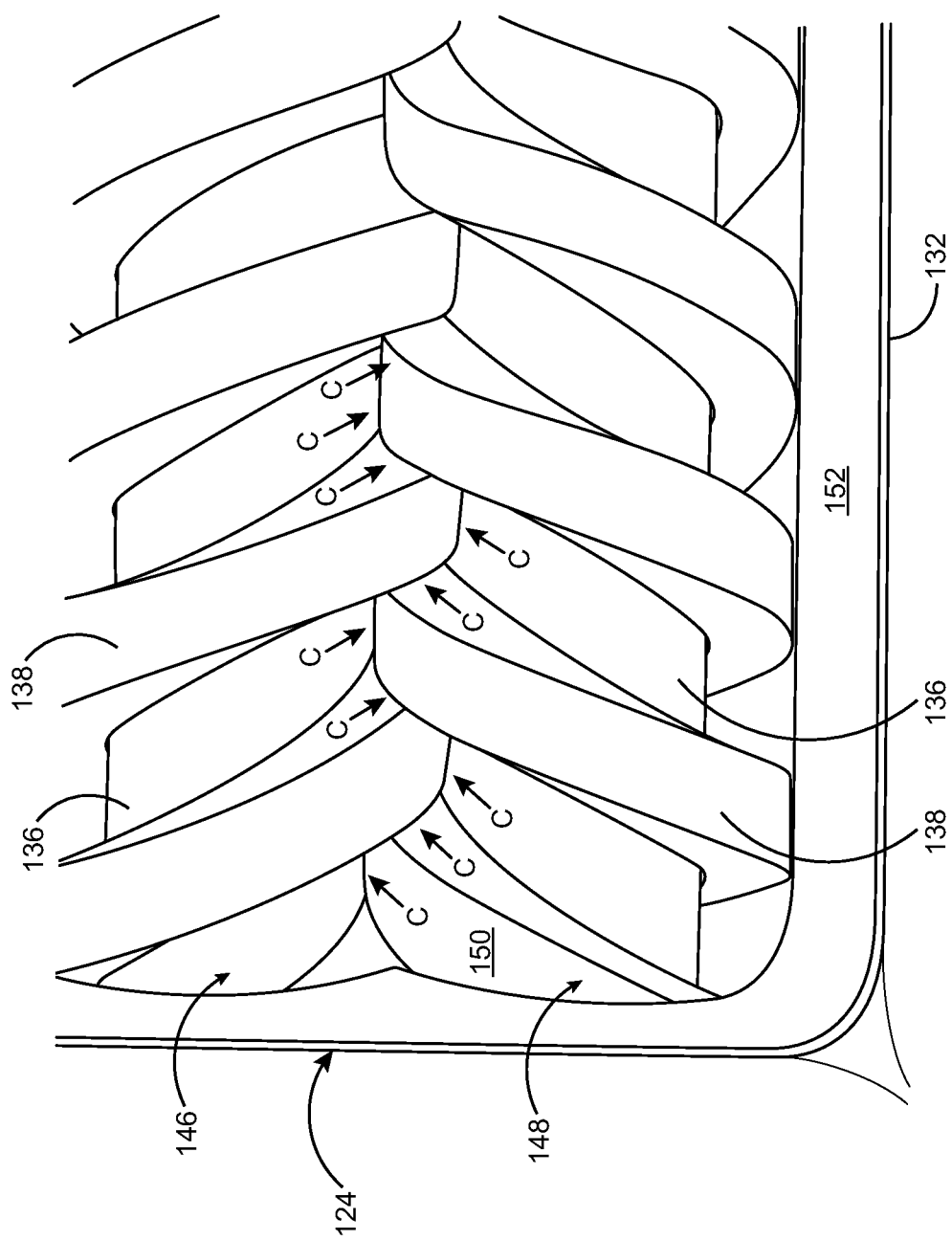
FIG. 2 shows a perspective view of the compression screw assembly of the animal feed producing system, illustrating a plurality of flights and roots of a first screw and a second screw in accordance with the present teachings.
Figure 3:
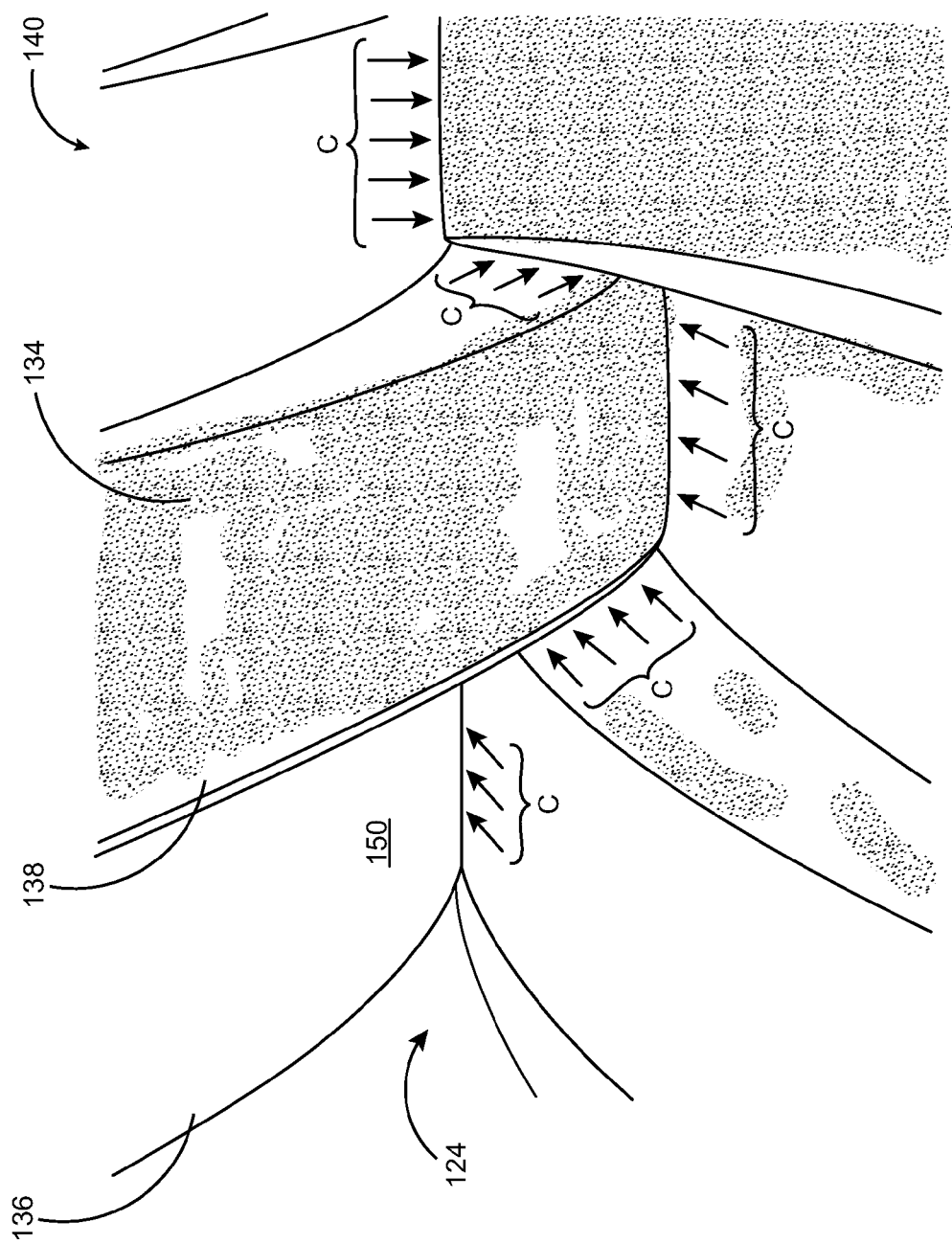
FIG. 3 shows a perspective view of the compression screw assembly illustrating grains passing through a feed section of the plurality of screws in accordance with the present teachings.
Figure 4:
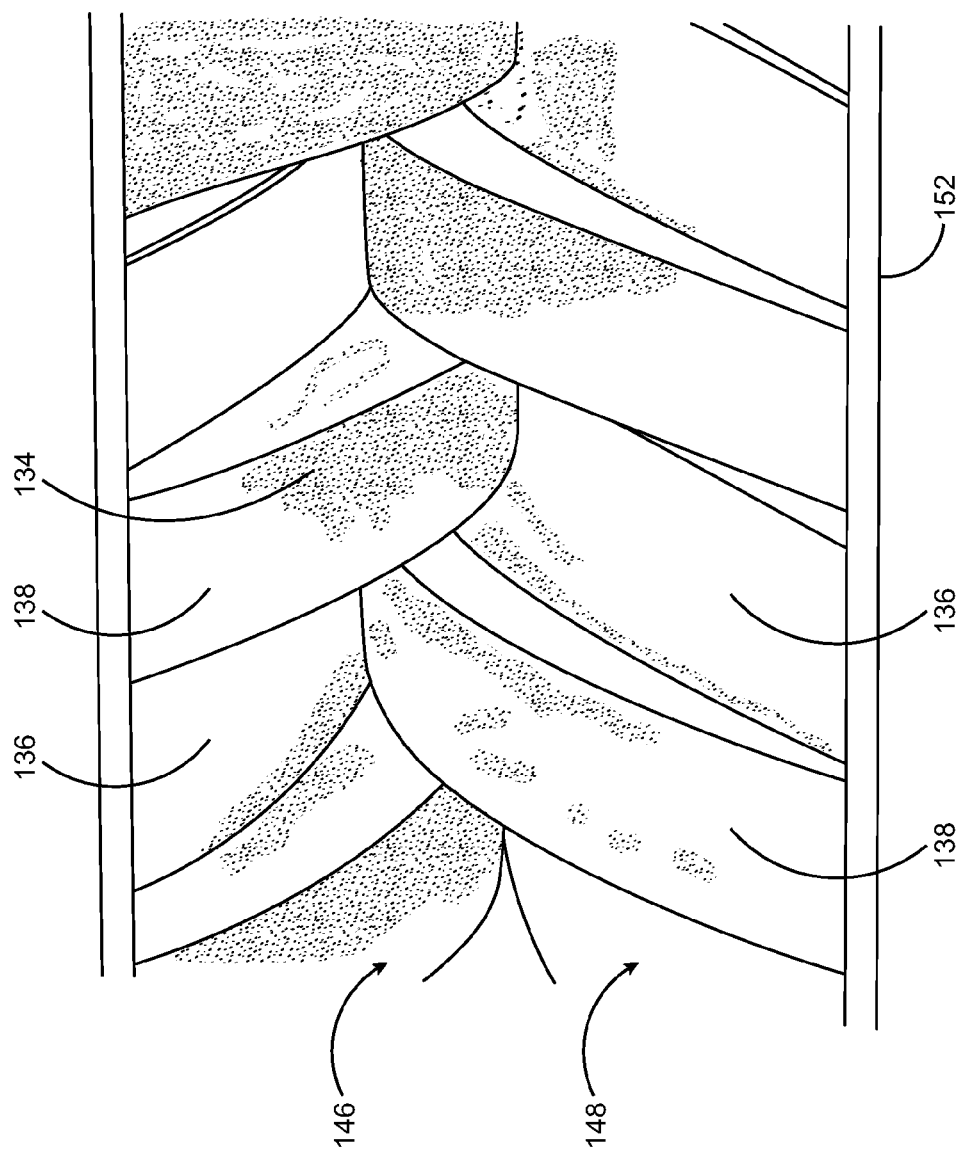
FIG. 4 shows a perspective view of the compression screw assembly illustrating compressed grains at the plurality of flights and roots at the middle sections of the first screw and the second screw in accordance with the present teachings.

As is shown more detail in FIGS. 2-4, the grains 134 are forced and compressed in several converging areas (indicated by the solid-line arrow C) located on the flights 138 and the roots 136 of the screws 146, 148. The compression is created by the reduced surface between the plurality of flights 138 and the roots 136. The edges of the flights 138 and roots 136 entrap the grain 134 within the area indicated by arrow C. As the grains 134 get compressed between the flights 138 and the roots 136, a perpendicular compression (perpendicular to the flow of material which is from the feed section 140 to the tip section (not shown) of the screws 146, 148) is created. This perpendicular compression derives at least two beneficial effects (by design) on the material. First, one benefit is that, it creates a mechanical compression which generates mechanical heat which directly applies heat to the grains 134. Secondly, the perpendicular compression changes the mechanical properties of the grains 134, thereby making fine granules of the grains 134 that are substantially modulus such that these granules can be pushed into smaller orifices of die(s) (not shown) located downstream from the tip section (not shown) of the screws 146, 148. Namely, the grains should be sufficiently fine so as to flow like a fluid. Further, this granule sized grains are bound into a dense form. In addition, each time the grains are compressed by the screws, air present in the grain is removed. This removal of air is one of the factors that allow the grains to be compressed into a more condense form in the die.

The edges of the plurality of flights 138 are intentionally designed to be very distinct and sharp so that they can shear the grains into a very fine particulate. Shearing is an effective way to apply heat to the grains 134, because it self-generates heat during the process. An additional advantage of the animal feed producing system 100 is that, the plurality of screws 146, 148 rotates at higher rotation per minute (RPM) which increases the shear rate at an exponential rate by design which in turn reduces the operating cost of applying heat as well as breaks down the particulate to make it more compressible and bindable.

FIG. 5 illustrates a transition section from the feed section 140 to a more aggressive first middle section 142 to a less aggressive middle section 144. In this transition section, more compression force occurs because more flights 138 are included per linear inch. This causes increased compression force and generates the production of more heat. Also, a backup region 156 is provided while the grain 134 is transitioning from this first middle section 142 to the second middle section 144. The backup region 156 causes a backup of grain flow which creates lateral compression in the material similar to the compression created by forcing the grain through the smaller orifices in the die(s). In the backup region 156, the grain slows down, because of the transition and grain backs up in the flow creating the lateral compression. As the grain advances to the less aggressive middle section 144, the grain encounters less aggressive compression because fewer flights are provided within this section.

FIG. 5 illustrates another example of lateral compression provided by the design of the screw. In FIG. 5, the screws 146, 148 are designed such that there are changes in the number of flights and changes in the flight pitch. In FIG. 5, there are transitions from section 158 having fewer flights 138 spaced apart with a more forward angle of pitch 154 to an intermediary section 160, then to a section 162 having more flights 138 with a far less forward pitch 164. At the intermediary section 160, the grain 134 experiences less flow and more compression forces applied onto the grain 134. At section 162, the flow of the grain increases. The transition from sections in the screws 146, 148 comprising different number of flights and flight pitches is another form of creating lateral compression. This compression force applied onto the grain is produced as a result of the screw design. Thus, the lateral compression can be performed onto the grain at regions of the screw which has nothing to do with having a conventional die with restrictive orifices positioned downstream from the plurality of screws 146, 148.

Figure 6:
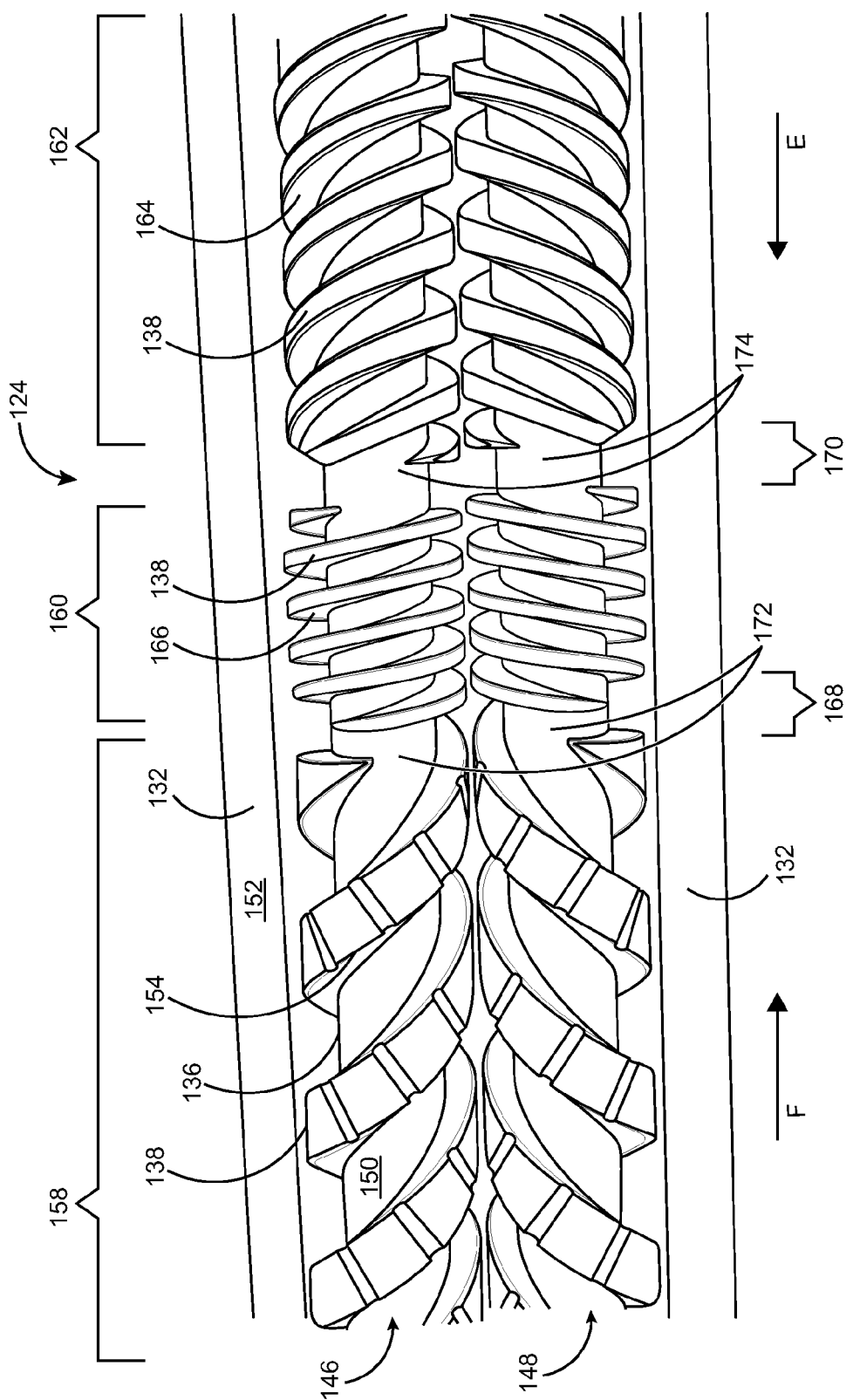
FIG. 6 shows a perspective view of the compression screw assembly illustrating different set of flights and roots in the first and second screws of the animal feed producing system in accordance with the present teachings.

In FIG. 6, as the grain travels through the points of compression, initially, the grain flows faster through section 158, because the angle of pitch 154 is the most forward. Next, the grain slows down to its slowest speed through section 160, because the angle of pitch is the least forward. Then, the grain speeds up through section 162, but at a rate slower than in section 158, because the angle of pitch 164 is less forward than the angle of pitch 154. On the other hand, the material flows through section 162 faster than section 160, because the angle of pitch 164 is more forward than the angle of pitch 166.

Furthermore, section 160, in FIG. 6, functions as an additional compression zone. Due to the generally flatness of the pitch 166 in section 160, this backs up the flow of the grain into a back-up region 168 or a back-up region 170, depending upon the direction of the grain. Backing up of the grain into back-up region 168 or back-up region 170 creates additional compression onto the grain. When the grain travels in the direction of arrow E, back-up region 168 is developed at positions 172 in front of section 158. In contrast, when the grain travels in the direction of arrow F, back-up region 170 is developed at positions 174 in front of section 164.

Thus, for example, when travelling in the direction of arrow E, the grain travels relatively fast through section 164, then slows through section 160, and speeds up in section 164, but not as fast as in section 158. As the grain travels through section 160, the pressure created in the back-up region 168 is then released. As the grain advances through the twin screws, the grain may encounter several alternating stages of compression and release.

In general, the repeated compression and release as the grain transitions between sections of the multiple screws having different numbers of flights and/or pitches generates substantial shear stress on the grain. The shearing of the grain provides an economical and cost effective manufacturing process that does not require the addition of heat to maintain the process after the initial start-up. During the startup, as the motor and gearbox (not shown) begin to rotate the screws, a heating mechanism can be utilized to heat the barrel of the screws to approximately 220 F. After the grains start flowing through the screws, the heat of the barrel of the screws is turned off, because the shearing and compression forces generate a substantial amount of heat. Thus, in the preferred embodiments, following the initial startup, the heat is turned off, no supplemental heat is added, and only the motor and gearbox are used to rotate the screws. Therefore, the process according to the present teachings creates a mechanical compression that generates mechanical heat which directly applies heat to the grains, which provides an economical advantage over conventional processes.

FIGS. 1-6 depict embodiments of different screw geometries having various restrictive areas to create the perpendicular compression (created by forcing grain through tighter cavities of the flights and roots) and the lateral compression (created by changing the number of flights and/or the pitch 154, 164 of the flights 138). Exemplary embodiments of the screws can have various configurations, such as uniform mixing sections, various mixing sections, a meshed section, a non-meshed section, a lateral compression section, a perpendicular sections, a back-up section, and a combination thereof.

Various embodiments of the animal feed producing devices 100 described herein enable the production of grains, pellets, cubes, and tubs without the addition of binders and fillers to avoid negatively affecting the nutritional value of the final product. Various embodiments of the distiller grain pellet producing devices produces a livestock feed material in the various forms of distiller dried grains having high shipping durability, high quality, and high nutritional value. The final product provides optimum nutritional value in a very compact and efficient form. Various embodiments extract and collect grain oils and moisture from the distiller dried grains during the production process. Various embodiments produce various structural forms, for example, in the form of pellets, cubes, or tubs having various configurations such as round, square, rectangular or oblong.

Various embodiments of the device provides a high-protein and fat content product, without additives, that can be spread onto the ground as livestock feed in the form of pellets or cubes and is capable of enduring various weather conditions. Various embodiments provide a method that does not require heating or curing after the products exit the device.

Optionally, oils, water, and vapors can be extracted from the distiller grain as it exits the device.

In various embodiments, after exiting the die (not shown), the distiller grain can be cut into nutritional pellets or cubes having a desired length or shape and discharged from the device into a container. The pellets may also be referred to as range cubes.

In various embodiments, in addition to producing pellets/cubes, device 100 may be employed to produce a final product shaped as large tubs having distiller grains compressed therein. Farmers often use animal feed supplements in the formed as solid blocks or solidified in tubs. The solid feed supplements are usually placed about the area in which the livestock grazes such that the livestock can feed on a free-choice basis. The tubs may weigh approximately 200 pounds and the density of the tubs limits the intake of the supplement, for example, to roughly 2-pounds of product per day, which allows the livestock eating the product to meet their daily requirements.

Figure 7:
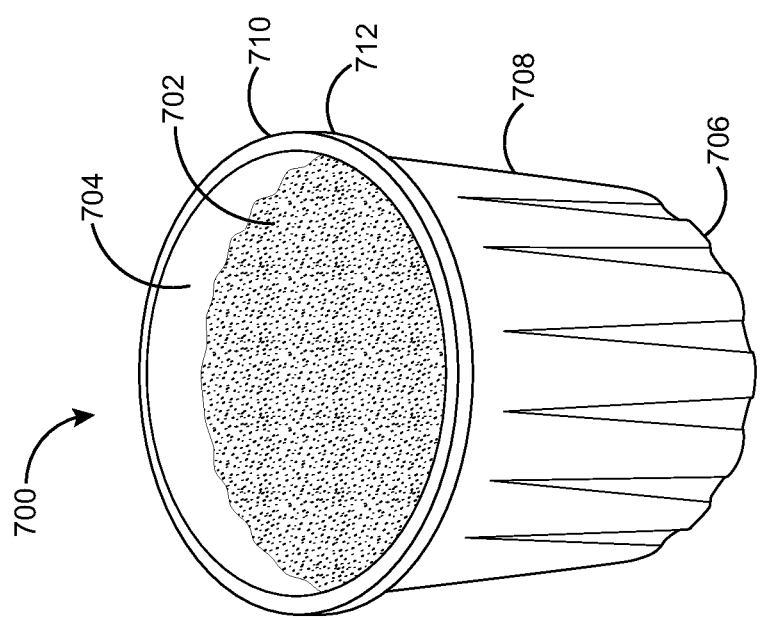
FIG. 7 shows a perspective view of a feed tub according to the present teachings.

In an exemplary embodiment directed towards producing the solid tubs shown in FIG. 7, the final product of animal feed composition is dispersed into a container, such as a feed tub 700. FIG. 7 is a perspective view for such an exemplary feed tub container with the animal feed supplement 702 solidified therein. In this example, the feed tub has an open top end 704, a closed bottom end 706, and a surrounding side wall 708. The open top end 704 is defined by an annular rim 710. The rim 710 of the tub 700 may further include a downturned lip 712 to aid in grasping of the container by a user.

The tub 700 can be made in a variety of configurations having various sizes and shapes. For example, rectangular, square, oval, triangular and the like are suitable configurations for the feed tub. Furthermore, the tub can be quite deep or shallow, and its width and length dimensions can be varied to provide for the desired characteristic in such containers.

The feed tub 700 may be fabricated from plastic or any other suitable conventional material. The feed tub 700 is suitable for manufacture, for example, by injection molding, compression molding, extrusion molding, blow molding, thermoforming, and vacuum forming.

In use as a feed tub, the edible feed supplement is contained in the tub 700 and accessed by the livestock through an open top end 704 which exposes the edible feed supplement. While the opening 704 is shown as being generally circular, it may have any desired shape including without limitation polygonal and/or irregular peripheries. In various embodiments, the edible feed supplement has a texture that the livestock licks, thereby increasing consumption time. While embodiments of the present technology are described herein primarily in connection with a solid animal feed, the concepts are also applicable to other animal feed products having a high-fat content, with no additives, such as dry grain, cubes, range cubes, calf cubes, mini-cubes, pellets, or any other suitable animal feed product.

In various embodiments, a wide variety of different kinds of pellets, cubes or tubs can be produced from various loose granular materials using substantially the same device.

The foregoing description of the preferred embodiment of the present teachings has been presented for the purpose of illustration and description. It is not intended to be exhaustive or to limit the invention to the precise form disclosed. Many modifications and variations are possible in light of the above teachings. It is intended that the scope of the present teachings not be limited by this detailed description, but by the claims and the equivalents to the claims appended hereto.

What is claimed is:

1. An animal feed producing system comprising:
   at least one compression screw assembly having a plurality of screws, wherein each compression screw assembly includes at least a first screw and a second screw and a plurality of barrels;
   each of the plurality of screws includes a feed section, a plurality of middle sections, and a tip section;
   the compression screw assembly receives grains at the feed section;
   each of the plurality of screws includes a plurality of flights and a plurality of roots, wherein each of the plurality of screws is defined having a plurality of sections, each section includes a set of the plurality of flights and the plurality of roots configured to perform a predetermined compression selected from a group consisting of perpendicular compression and lateral compression;

the plurality of screws rotates to create a positive displacement pump that enables the grains to move forward from the feed section, through the plurality of middle sections, to the tip section and allows the grains to be in constant contact with surfaces of the plurality of screws and barrels and simultaneously by a compression created due to a reduction of surface area between the plurality of flights and the plurality of roots which require minimum heat from external heat sources after a start-up period, wherein moisture present in the grains is trapped at a temperature which creates a lubrication property that enhances the grains ability to flow when passing through a reduced surface area between the plurality of flights and the plurality of roots;

the plurality of screws is configured to create the perpendicular compression applied to the grains by forcing the grains through restrictive areas between the plurality of flights and the plurality of roots;

the plurality of screws is configured to create the lateral compression by transferring the grains between successive sections having differing configurations;

the plurality of screws is configured to create mechanical heat applied to the grains by compressing the grains between the restrictive areas of the plurality flights and the plurality of roots to convert the grains to a modulus statue;

at least one of the plurality of flights and the plurality of roots includes sharp edges designed to effectively shear the grains into fine granules in response to rotation of the plurality of screws;

at least one of the plurality of middle sections comprises a transition section including a backup region interdisposed between a more aggressive compression region and a less aggressive compression region;

an angle of pitch of the plurality of flights, included in each of the more aggressive compression region and the less aggressive compression region, is configured such that the grains flow at a predetermined flow rate, and the angle of pitch is configured such that a predetermined amount of compression is applied as the grains move through the more aggressive compression region and the less aggressive compression region, respectively; and the backup region backs up a flow of the grains causing lateral compression applied to the grains in the backup region;

the at least one of the plurality of the middle sections being configured in a pattern to provide a plurality of alternating stages of compression and release, wherein:

each of the alternating stages is configured having a plurality of subsections, wherein each subsection is configured having a different amount of compression applied on the grains as the grains move through each subsection and each subsection is configured having a different angle of pitch, wherein the plurality of subsections within at least one of the plurality of alternating stages comprises at least a first subsection, a second subsection, and a third subsection, wherein:

the first subsection is configured having a most forward angle of pitch relative to roots of the screws, and the first subsection is configured having fewer flights than the second subsection and the third subsection of the plurality of alternating stages;

a second subsection is configured having a flat pitch relative to the roots of the screws to back up flow of the grains as the grains move through the second subsection of the at least one of the plurality of alternating stages;

a third subsection is configured having a least forward angle of pitch relative to the roots of the screws, and the third subsection is configured having more flights than the first subsection and the second subsection provided within the at least one of the plurality of alternating stages;

wherein, as the grains move through the at least one of the plurality of alternating stages, the grains travel at a fastest rate of speed through the first subsection, the grains travel at a slowest rate of speed through the second subsection, and the grains travel at an intermediate rate of speed through the third subsection, wherein the intermediate rate of speed is slower than the fastest rate in the first subsection and faster than the slowest rate in the second subsection; and at least one screw rotating motor for rotating the plurality of screws, whereby the grains are passed through the plurality of screws to generate fine granules of dry grains in a linear rate.

2. The animal feed producing system of claim 1, wherein the dry grains are shaped to form a pellet.

3. The animal feed producing system of claim 1, wherein the dry grains are shaped to form a cube.

4. The animal feed producing system of claim 1, wherein the dry grains are shaped to form a tub.

* * * * *